(12) United States Patent
Smith

(10) Patent No.: US 7,238,767 B2
(45) Date of Patent: Jul. 3, 2007

(54) SILICONE MODIFIED POLYUREA

(75) Inventor: Stuart B. Smith, Loganville, GA (US)

(73) Assignee: Reactamine Technology, LLC, Conyers, GA (US)

( * ) Notice: Subject to any disclaimer, the term of this patent is extended or adjusted under 35 U.S.C. 154(b) by 0 days.

(21) Appl. No.: 11/257,506

(22) Filed: Oct. 25, 2005

(65) Prior Publication Data

US 2006/0047090 A1    Mar. 2, 2006

Related U.S. Application Data

(62) Division of application No. 10/648,934, filed on Aug. 27, 2003.

(60) Provisional application No. 60/412,211, filed on Sep. 23, 2002, provisional application No. 60/408,797, filed on Sep. 9, 2002.

(51) Int. Cl.
*C08G 77/26* (2006.01)

(52) U.S. Cl. .................... 528/28; 528/38; 556/425

(58) Field of Classification Search ............ 528/28, 528/38; 556/425
See application file for complete search history.

(56) References Cited

U.S. PATENT DOCUMENTS

| | | | | |
|---|---|---|---|---|
| 3,046,250 A | * | 7/1962 | Plueddemann | 528/28 |
| 3,389,160 A | * | 6/1968 | Reid | 556/423 |
| 3,954,650 A | * | 5/1976 | Bliss | 252/182.13 |
| 5,759,695 A | | 6/1998 | Primeaux, II | |
| 2004/0054112 A1 | | 3/2004 | Smith | |

FOREIGN PATENT DOCUMENTS

WO    WO-2004/022619    3/2004

* cited by examiner

*Primary Examiner*—Margaret G. Moore
(74) *Attorney, Agent, or Firm*—Patton Boggs, LLP

(57) ABSTRACT

The present invention includes a novel polyol prepolmer including an aliphatic amine, aromatic amine, or a mixture of both aliphatic and aromatic amines with an epoxy functional silicone to produce the novel polyol prepolymer chain extender. In another aspect of the invention, the novel polyol prepolymer chain extender is reacted with a polyisocyanate to produce a novel silicone modified polyurea having improved adhesion, chemical resistance, UV stability, and decreased shrinkage properties.

1 Claim, No Drawings

SILICONE MODIFIED POLYUREA

CROSS-REFERENCE TO RELATED APPLICATIONS

This is a divisional application of prior U.S. patent application Ser. No. 10/648,934, filed 27 Aug. 2003, which claims the benefit of U.S. Provisional Application No. 60/408,797, filed 09 Sep. 2002 and U.S. Provisional Application No. 60/412,211, filed 23 Sep. 2002. The entireties of these aforementioned applications are incorporated herein by reference.

FIELD OF THE INVENTION

The present invention relates to synthetic resins and processes for making the same and more particularly, relates to methods and compositions for making aliphatic and aromatic two part polyurea elastomers having improved adhesion, chemical resistance, UV stability, and decreased shrinkage properties.

PROBLEM

Polyurea's are defined as amine terminated polyols reacted with polyisocyanates. Polyureas were developed in the 1980's for rapid process application of a durable protective membranes for a myriad of products and technologies. Conventional polyurea coatings typically possess several characteristics that have made them desirable as a seamless membrane including fast, consistent reactivity and cure, moisture and temperature insensitivity during application, exceptional elastomeric quality, hydrolytically stable (i.e. low water absorption), high thermal stability, and that they are auto catalytic and do not emit solvents or VOC's when applied. However, many characteristics of conventional polyureas are unfavorable and limit their use in many applications.

The conventional aromatic polyurea uses mixtures of aromatic diamines such as diethyltoluenediamine and polyether amines reacted with an methylene diphenyl isocyanate (MDI) prepolymer with optional levels of propylene carbonate added. This material reacts in 5 seconds to produce a polyurea. A conventional aliphatic polyurea can be made with aliphatic isocyanate reacted with aliphatic amines, such as Jefferamine T-403, D400, D2000, or NH 1220 from Huntsman and NH 1420 from Bayer. This reaction is very fast with gel times of 5 seconds. Both the conventional aromatic and aliphatic polyureas are attacked by strong solvents such as xylene, toluene, acetone, low pH acids, and high pH caustics.

Another undesirable characteristics of conventional polyureas is that conventional polyureas possess poor adhesion properties. Specifically, the fast reaction times inherent in conventional polyureas cut short the time needed for a conventional polyurea to penetrate and adhere to its substrate. Commercial epoxy type resins have been used in place of conventional polyureas because they are slow to react but penetrate to give excellent adhesion and chemical resistance.

Yet another problem of conventional polyureas and epoxies is that they do not possess good color stability or UV resistance. Aromatic polyureas, due to their aromatic reactants, generally turn yellow or brown when exposed to ultraviolet (UV) light and oxygen. Since polyureas can be formulated in a variety of colors, this discoloration trait adversely affects the intended finish color of the conventional polyurea, especially in light colors.

Also, conventional polyureas shrink about 1%-1.5% when they cure, which means, for example, when 1,000 linear feet of polyurea is applied to a roofing project, once it cures, some 10 to 15 feet of polyurea will shrink and need to be reapplied.

Another problem of conventional polyureas is that when mixing them for the first time, such as using an impingement gun, a first reaction takes place between those highly reactive ingredients followed by later subsequent reactions between the less reactive reactants. This causes non-homogenous mixtures in the polyurea with the end result being a polyurea with varying finishes, properties, and consistency. Other factors that can lead to these non-homogenous mixtures is the temperature of the reactants as they are mixed. These non-homogenous mixtures can occur in one order with the reactants at a certain temperature and another order at another temperature.

To work around some of the problems, silicone epoxy products have been used in place of conventional polyureas due to their superior chemical resistance and low surface tension, which better wets the surface of substrates to improve adhesion, however these silicone epoxy products are very slow to react. Silicones have also been used in place of conventional polyureas because of their outstanding weatherability, color stability, and UV resistance. In addition, conventional polyureas and epoxies have more porous surfaces compared to silicones and this causes poor graffiti resistance compared to silicones. Although epoxies possess good chemical resistance, they are slow to cure and are brittle thereby limiting their usefulness in applications. It is well known that silicones impart mar resistance.

In an effort to improve chemical resistance and adhesion properties in conventional polyureas, epoxies have been reacted with amines and isocyanates. However, epoxy modified polyureas are very difficult to maintain viscosity or molecular weight. For example, the typical bis A epoxy when reacted with primary and secondary amines forms amino alcohols. The OH groups on the amino alcohols reacts with the isocyanate to produce a polyurethane, which is not a polyurea and which further acts as a cross linker and not a chain extender. These amino alcohols, given time, will set up and be rather useless in any commercial sense.

Information relevant to attempts to address these problems can be found in the U.S. Pat. No. 5,731,397 issued 24 Mar. 1998 to Primeaux and U.S. Pat. No. 5,962,618 issued 5 Oct. 1999 to Primeaux.

Therefore, there is a need for a polurea with a silicone backbone that would increase chemical resistance, UV stability, adhesion, and decreased shrinkage properties. Furthermore, there is a need for polyurea that is not susceptible to non-homogeneous mixtures that provide polyureas in differing consistencies and properties.

SOLUTION

The above described problems are solved and a technical advance achieved in the art by a polyol prepolymer chain extender with aliphatic epoxy end groups that can react with either an aromatic amine, an aliphatic amine, or a combination of both aromatic and aliphatic amines. In addition, the polyol prepolymer chain extender is then mixed with other B-component reactants prior to reacting with the A-component polyisocyanates to form silicone modified polyureas, which significantly improves the characteristic of the polyurea with the formation of de minimis amounts of amino alcohols or polyurethanes.

The polyol prepolymer chain extender can be either aromatic, aliphatic, or both. The polyol prepolymer chain extender is preferably prepared prior to mixing with other B-component ingredients. By reacting an epoxy silicone with a primary amine, a polyurea is produced which includes a silicone backbone for improved properties.

Thus, the present polyol prepolymer chain extenders and silicone modified polyureas provides improved chemical resistance, UV and color stability, adhesion, and decreased shrinkage to meet the requirements of the user.

DETAILED DESCRIPTION OF THE INVENTION

Polyureas typically have A-component reactants and B-component reactants that are kept in separate containers or vessels, due to their reactivity, and are mixed just prior to being applied to a substrate. Conventionally, the A-component reactants include a polyisocyanate and the B-component reactants include an amine terminated polyol.

The present invention B-component reactants include a novel polyol prepolymer chain extender that includes at least one amine reacted with an epoxy functional silicone. In one aspect of the present invention, the polyol prepolymer chain extender includes a silicone that has an epoxy end group which reacts with an aromatic or aliphatic amine or combination of aromatic and aliphatic amines to produce the novel polyol prepolymer chain extender. In one aspect of the present invention, the epoxy end group on the silicone is aliphatic and more preferably is glycidyl ether. The aliphatic epoxy end group provides increased UV and color stability of the silicone modified polyurea. Exemplary epoxy functional silicones include 2810 from OSI Specialties and SILRES© HP 1000 from Wacker Chemicals Corp. Both products have Hydrogen equivalent weights of 300-400. One non-limiting example of an epoxy functional silicone is shown in formula (I):

The amines of the B-component polyol prepolymer chain extender preferably include primary and secondary amines reacted with the epoxy functional silicone. In one aspect of the polyol prepolymer chain extender, the aliphatic primary amines are low molecular weight amines, such as D230, D400, or T403 from Huntsman, polyaspartic amines, such as NH 1220 and NH 1420 from Bayer, and dimethylthiotoluenediamine (DMTDA), 3,5-dimethylthio-2,6-toluenediamine or 3,5-dimethylthio-2,4-toluenediamine, such as E-300 from Albermarle Corporation. In addition, aromatic amines may be used in the polyol prepolymer chain extender, such as diethyltoluenediamine (DETDA) E-100 Ethacure from Albemarle Corporation. In one aspect of the present polyol prepolymer chain extender, these amines are used in combination with one another or separately, when reacted with an epoxy functional silicone. The gel and tack free time for the two component silicone modified polyurea can be adjusted by using different combinations and amounts of these amines with the epoxy functional silicone during the preparation of the polyol prepolymer chain extender. For example to produce a silicone modified polyurea with fast gel and tack free time, a polyol prepolymer chain extender is prepared including D400 and E-100 which is reacted with an epoxy functional silicone prior to mixing with the polyisocyanate. Conversely, for slower gel and tack free time, a polyol prepolymer chain extender is prepared including NH1220 and D400 which is reacted with an epoxy functional silicone. Some non-limiting examples of the aliphatic primary amines are shown in formulas (II), (III), and (IV):

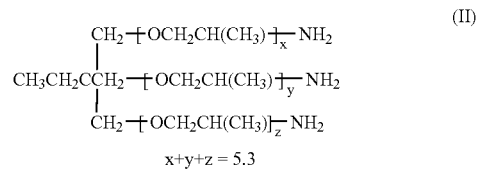

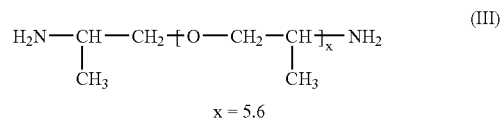

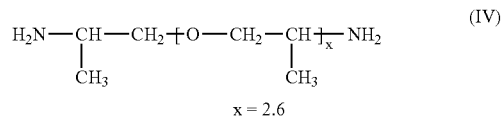

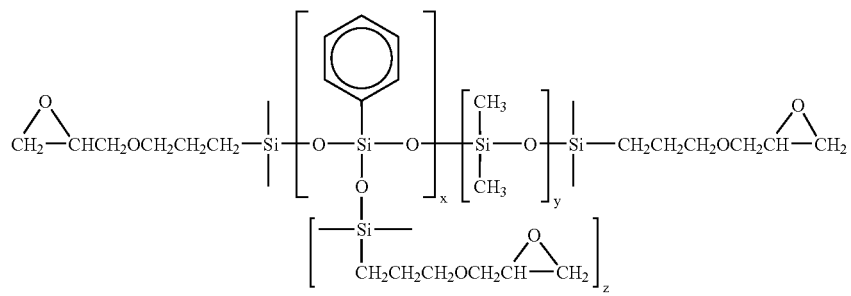

The following chart shows the hydrogen equivalent weights of some these non-limiting aliphatic primary amines.

| Product | Equivalent/gm |
|---------|---------------|
| T-403   | 80            |
| D-400   | 230           |
| D-230   | 60            |

In addition to the novel polyol prepolymer chain extender herein described, the B-component of the present silicone modified polyurea also preferably includes high molecular weight amine-terminated polyethers or simply polyether amines. The term "high molecular weight" is intended to include polyether amines having a molecular weight of at least about 2000. Particularly preferred are the JEFFAMINE® series of polyether amines available from Huntsman Corporation; they include JEFFAMINE D-2000, JEFFAMINE D4000, JEFFAMINE T-3000 and JEFFAMINE T-5000.

In addition, the B-component of the silicone modified polyurea also preferably includes addition amounts of curative amines, such as E-100 Ethacure from Albermarle. Also preferably, aromatic diamines, such as Unilink 4200 from UOP, which is a secondary amines, are added to the B-component to help control the cross-linking and reactivity of the silicone modified polyurea.

In addition, the B-component preferably includes at least one coupling agent, such as A1100. The coupling agent is typically a silane with amine on the end of it so it become reactive as part of the structure. Other coupling agents that can be used are glycidylether silane, such as A-187 from OSi Specialties, Inc., which is a polyglyceride.

Also, pigments, for example titanium dioxide, may be incorporated in the B-component, to impart color properties to the silicone modified polyurea. Typically, such pigments are added with the in the B-component prior to mixing with the A-component. A non-limiting example of a titanium dioxide pigment is Ti-Pure® R-900 rutile titanium dioxide from E.I. DuPont de Nemours Co.

In addition, UV stabilizer materials are also preferably mixed with the B-components, to impart better UV resistance to the silicone modified polyurea. Some non-limiting examples of UV stabilizers are Tinuvin® 328 and Tinuvin® 765 from Ciba-Geigy Corp.

The aliphatic and/or aromatic silicone modified polyurea of the present invention typically includes an A-component, such as an isocyanate, which may be an aliphatic or aromatic isocyanate. The aliphatic isocyanates are known to those in the art. For instance, the aliphatic isocyanates may be of the type described in U.S. Pat. No. 4,748,192, incorporated by reference herein. Accordingly, they are typically aliphatic diisocyanates, and more particularly are the trimerized or the biuretic form of an aliphatic diisocyanate, such as, hexamethylene diisocyanate (HMDI); or the bifunctional monomer of the tetraalkl xylene diisocyanate, such as tetramethyl xylene diisocyanate (TMXDI). Cyclohexane diisocyanate is also to be considered a preferred aliphatic isocyanate. Other useful aliphatic polyisocyanates are described in U.S. Pat. No. 4,705,814, also incorporated by reference herein. They include aliphatic diisocyanate, for example, alkylene diisocyanate with 4 to 12 carbon atoms in the alkylene radical, such as 1,12-dodecane diisocyanate and 1,4-tetramethylene diisocyanate. Also described are cycloaliphatic diisocyanates, such as 1,3- and 1,4-cyclohexane diisocyanate as well as any desired mixture of these isomers; 1-isocyanato-3,3, 5-trimethyl-5-isocyanatomethylcyclohexane (isophorone diisocyanate); 4,4'-, 2,2'- and 2,4'-dicyclohexylmethane diisocyanate, as well as the corresponding isomer mixtures, and the like. Exemplary isocyanate monomers include monoisocyanate compound (p=1) such as m- or p-isopropenyl-α, α dimethylbenzoyl isocyanate.

Aromatic isocyanates may also be employed. Suitable aromatic polyisocyanates include, but are not necessarily limited to m-phenylene diisocyanate; p-phenylene diisocyanate; polymethylene polyphenylene diisocyanate; 2,4-toluene diisocyanate; 2-6 toluene diisocyanate; dianisidine diisocyanate, bitolylene diisocyanate; naphthalene-1,4-diisocyanate; diphenylene 4,4'-diisocyanate and the like. Suitable aliphatic/aromatic diisocyantes, include, but are not necessarily limited to xylylene-1,3-diisocyanate, bis(4-isocyanatophenyl)methane; bis(3-methyl-4-isocyanatophenyl)methane; and 4,4'-diphenylpropane diisocyanate. The aforestated isocyanates can be used alone or in the combination. In one embodiment of the invention, aromatic isocyanates are preferred.

The isocyanate compound used in the present invention has a structure wherein all of the isocyanate (NCO) groups in the molecule have secondary or tertiary carbon bonded thereto. The groups other than the NCO group bonding to the secondary or the tertiary carbon are not limited, for example, in terms of the number of carbon atoms, bulkiness, inclusion of hereto atoms such as O, S, and N, and the like. The two groups bonding to the tertiary carbon may be either the same or different from each other.

When producing a polyol prepolymer chain extender or an isocyanate prepolymer, it is necessary have to have an adduct or excess amount of amine to keep the reactants liquid. This also means that the adduct or excess of a mine reacts with the isocyanate prepolymer when making the final silicone modified polyurea. This requires carefully adjusting of the amine level, so that the speed of reactivity and conversion are controlled. Therefore, when mixing an A-component and a B-component together, it is preferable to include 105% stoichiometrically of the A-component compared to the B-component. This means a 5% stoichimetric excess of polyisocyanates are preferably used in the mixtures. This is done because any excess isocyanate will moisture cure.

This careful attention to the amine adduct is also important during application to a substrate, such as spraying. The viscosity of the mix at the tip of the application device, such as an impingement gun, is very important, because if the viscosity is too high then the internal mix where the A-component reactants and the B-component reactants is inadequate for a consistent silicone modified polyurea. Furthermore, if the viscosity is too high, then additional heat may be required to raise the temperatures of the reactants to bring the viscosity down low enough to spray.

Three non-limiting examples of the novel polyol prepolymer chain extender are shown in formulas (V), (VI), and (VII):

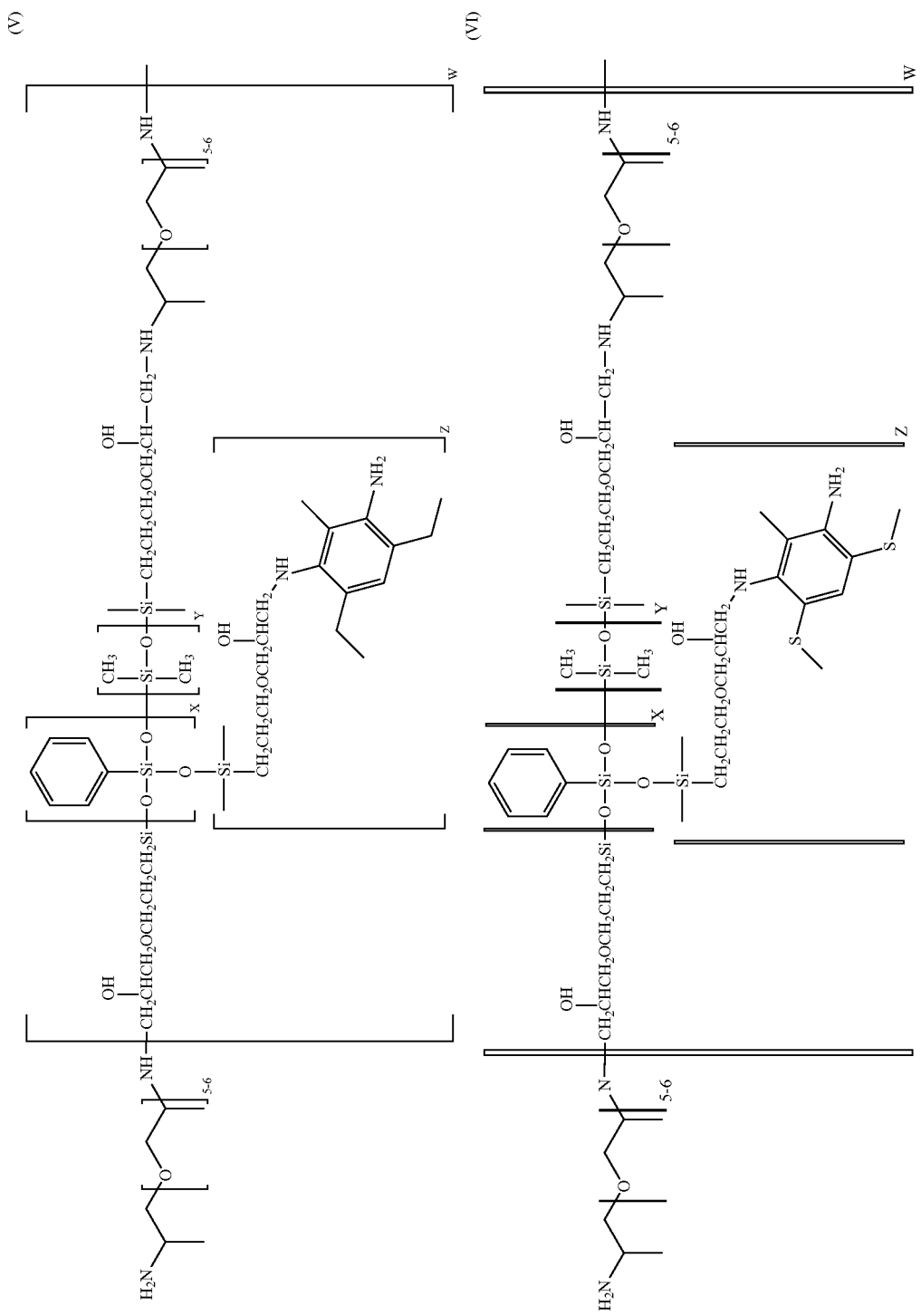

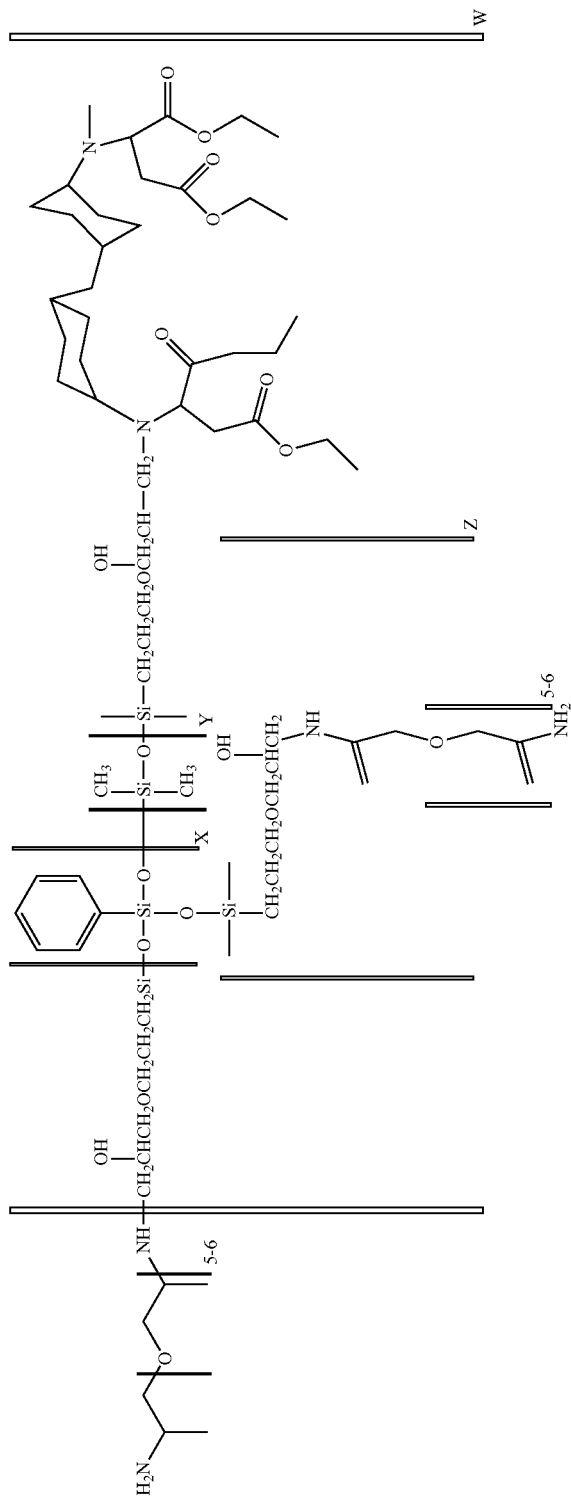

where the values of W, X, Y, and Z in formulas (V), (VI), and (VII) are as follows. The value for X is a number greater than or equal to 1, and preferably X is in the range of from 1 to 10, and more preferably, X is equal to 1. The value for Z is a number greater than or equal to 1. The value for Y is a number greater than or equal to 1, and preferably Y is in the range or from 10-200, and more preferably Y is equal to 15. The value for W is a number greater than or equal to 1.

Two non-limiting examples of the novel silicone modified polyurea are shown in formulas (VII) and (IX):

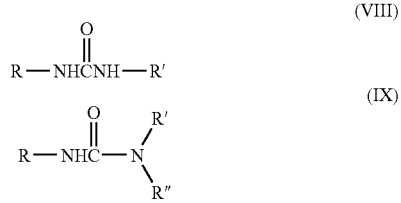

where R, R', and R" groups are the novel polyol prepolymer chain extenders described herein.

The following examples are provided to further illustrate the preferred embodiments of the present invention polyol prepolymer chain extender, but should not be construed as limiting the invention in any way. Compositions of the polyol prepolymer chain extender were produced by mixing amines with an epoxy functional silicone polymer shown in Examples 1-7. The following amines were reacted with the following silicone polymers noted in Table 1.

TABLE 1

|  | Examples | | | | | | |
|---|---|---|---|---|---|---|---|
|  | 1 | 2 | 3 | 4 | 5 | 6 | 7 |
| T-403 | 300 | — | — | — | — | — | — |
| 2810 or HP1000 | 100 | 100 | 100 | 100 | 100 | 100 | 100 |
| D400 | — | 300 | 300 | — | — | 300 | 300 |
| E-100 | — | — | 500 | — | 500 | — | — |
| D230 | — | — | — | 300 | 300 | — | — |
| E-300 | — | — | — | — | — | 500 | — |
| NH1220 | — | — | — | — | — | — | 400 |

All amounts of the compounds in Table 1 are represented by parts by weight. The reactions between the amines and the epoxy functional silicone polymer are slow and produce a low exotherm. In one aspect of the present invention, to increase reaction times of these reactants in Examples 1-7, the reactants are heated to a minimum temperature from 130° F. to 210° F., preferably 180° F., for two hours with an excess of amine to keep the product liquid, as provided in the Table 1. In another aspect of the present invention, the heating periods are between 30 minutes to 24 hours. In one aspect of the present invention the polyol prepolymer chain extender was allowed to cool prior to mixing with other reactants, described herein, in the B-component formula. In another aspect of the present invention, all reactants of the B-component formula, described herein, are mixed together and heated from 130° F. to 210° F., preferably 180° F., for a minimum of 30 minutes. The excess amount of amine can be adjusted to suit the purpose of a specific application. It is understood that increased amounts of silicone are better for polyurea performance. The polyisocyanate is preferably prepared using a 2000 molecular weight (mwt) silicone diol reacted with an isocyanate to form a polyurea prepolymer with better chemical and UV resistance when its product is reacted to the silicone modified polyol side. Silicone 2812 from OSI is a 2000 mwt diol with 1000 eq. Wt.

Examples of the prepolymer are as follows in Examples 8-9.

EXAMPLE 8

A 22% NCO aliphatic dimer such as N-3400 (Bayer) is reacted with 2812 (OSI) silicone at a ratio of:

| 80 PBW | N3400 |
| 20 PBW | 2812 |

All amounts are represented by parts by weight. This product is heated at 150° F. for two hours. The results are an 18% NCO polyurea prepolymer with silicone in the backbone.

EXAMPLE 9

A 29% NCO aromatic urethane isocyanate, ICI Huntsman 1680, is reacted with 2812 silicone at a ratio of:

| 60 PBW | 1680 |
| 40 PBW | 2812 |

All amounts are represented by parts by weight. This product was heated at 180° F. for two hours. The result is a 16% NCO polyurea prepolymer with silicone in the backbone.

Examples of silicone modified polyureas are given below in Examples 10-15.

EXAMPLE 10

Aliphatic Silicone Polyurea

An aliphatic silicone modified polyurea was prepared with 15 PBW T-403/2810 adduct (Example 1), 75 PBW NH1220 (Bayer) polyaspartic ester, 10 PBW pigment white (TiO$_2$), 1 PBW T-292 UV stabilizer, and 0.8 PBW A1100 silicone coupling agent. This constitutes the B-component of the aliphatic silicone modified polyurea. This was mixed to 110 PBW of polyurea prepolymer of Example 8. This aliphatic silicone modified polyurea has a gel time of about 45 seconds when spray applied by a Gusmer H2035 spray machine. The product was spray applied to a concrete and metal panel and checked for adhesion and placed in a weathermeter for UV stability.

EXAMPLE 11

Another Aliphatic Polyurea without Silicone

An aliphatic modified polyurea was prepared with 15 PBW T403, 75 PBW NH1220 (Bayer) polyaspartic ester, 10

PBW pigment white (TiO$_2$), 1 PBW T-292 UV stabilizer, and 18 PBW A1100 silane coupling agent. This constitutes the B-component of the aliphatic modified polyurea. This was mixed to 110 PBW of polyurea prepolymer consisting of N3400 and D2000 Jeffamines mixed to 18% NCO. This aliphatic modified polyurea has a gel time of approximately 15 seconds when spray applied by a Gusmer H2035 spray machine. The product was spray applied to a concrete and metal panel and checked for adhesion and placed in a weathermeter for UV stability.

EXAMPLE 12

Aromatic Polyurea

An aromatic silicone modified polyurea was prepared with 15 PBW E-100 diethyltoluenediamine (DETDA), 10 PBW D400, and 75 PBW D2000. This constitutes the B-component of the aromatic silicone modified polyurea. This was mixed to 110 PBW of polyurea prepolymer consisting of a Huntsman 9484 prepolymer MDI with 16% NCO. This aromatic silicone modified polyurea has a gel time of approximately 5 seconds when spray applied by a Gusmer H2035 spray machine. The product was spray applied to a concrete and metal panel and checked for adhesion and placed in a weathermeter for UV stability.

EXAMPLE 13

Another Aromatic Polyurea

An aromatic silicone modified polyurea was prepared with 25 PBW D400/2810/E-100 (Example 3), 75 PBW D2000. This constitutes the B-component of the aromatic silicone modified polyurea. This was mixed to 110 PBW of polyurea prepolymer consisting of a Huntsman 9484 prepolymer MDI with 16% NCO. This has a gel time of approximately 10 seconds when spray applied by a Gusmer H2035 spray machine. The product was spray applied to a concrete and metal panel and checked for adhesion and placed in a weathermeter for UV stability.

EXAMPLE 14

Another Aromatic Polyurea with Silicone

An aromatic silicone modified polyurea with silicone was prepared with 15 PBW E-100 diethyltoluenediamine (DETDA), 10 PBW D400/2810 adduct (Example 2), and 75 PBW D2000. This constitutes the B-component of the aromatic silicone polyurea. This was mixed to 110 PBW of polyurea prepolymer of 29% NCO aromatic urethane isocyanate (Example 9). This aromatic silicone modified polyurea has a gel time of approximately 8 seconds when spray applied by a Gusmer H2035 spray machine. The product was spray applied to a concrete and metal panel and checked for adhesion and placed in a weathermeter for UV stability.

EXAMPLE 15

Another Aromatic Polyurea with Silicone

An aromatic silicone modified polyurea with silicone was prepared with 25 PBW E-100/D400/HP1000 (Example 3), 75 PBW D2000. This constitutes the B-component of the aromatic silicone modified polyurea. This was mixed to 110 PBW of polyurea prepolymer of 29% NCO aromatic urethane isocyanate (Example 9). This aromatic silicone modified polyurea has a gel time of approximately 12 seconds when spray applied by a Gusmer H2035 spray machine. The product was spray applied to a concrete and metal panel and checked for adhesion and placed in a weathermeter for UV stability.

The compositions of Examples 10-15 were evaluated and are shown in Table 2.

TABLE 2

| Examples | Adhesion PSI | | UV Results in 1000 Hrs |
| | Concrete | Steel | |
| --- | --- | --- | --- |
| 10 | 400 | 1200 | Excellent |
| 11 | 309 | 1000 | Slight Yellow |
| 12 | 350 | 1250 | Yellow/Brownish |
| 13 | 400 | 1275 | Yellow |
| 14 | 450 | 1375 | Slight Yellow |
| 15 | 475 | 1400 | Very Slight Yellow |

The above UV results were achieved by using a B-bulb on a QUV machine. Also the adhesion results were performed using ASTM #4551 elcometer. The adducts in which E-100, silicone, and polyether amine that were pre-heated show better adhesion and UV resistance then when E-100 is added without being reacted.

The compositions of Examples 10-15 were evaluated for chemical resistance and are shown in Table 3.

TABLE 3

| Examples | Xylene | Toluene | Acetone | MEK | H$_2$SO$_4$ (50%) | HCl (50%) | H$_2$PO$_4$ (50%) | Caustic |
| --- | --- | --- | --- | --- | --- | --- | --- | --- |
| 10 | R | R | R | R | R | R | R | R |
| 11 | RC | RC | RC | NR | NR | NR | NR | NR |
| 12 | RC | RC | RC | NR | NR | NR | NR | NR |
| 13 | RC | RC | RC | NR | NR | NR | NR | NR |
| 14 | R | R | R | R | R | R | R | R |
| 15 | R | R | R | R | R | R | R | R |

All samples in Table 3 were placed in a glass cover for 48 hours with the chemical on the surface of the sample. R=Recommended, RC=Recommended conditional, NR=Not recommended Additional examples of silicone modified polyureas are given below. Comparative examples 16-18 are conventional ratios and compositions and do not include any polyol prepoymer. Examples 19-20 are examples of the present silicone modified polyurea and do include amounts of different combinations and ratios of the novel polyol prepolymer chain extenders.

COMPARATIVE EXAMPLES 16-17 AND EXAMPLES 18-20

TABLE 4

|  | Examples | | | | |
|---|---|---|---|---|---|
|  | 16 | 17 | 18 | 19 | 20 |
| Polyol prepolymer chain extender of Example 3 | — | — | — | — | 25 |
| D2000 (Jeffamine) | 50 | 50 | 45 | 45 | 45 |
| T-5000 (Jeffamine) | 10 | 10 | 10 | — | — |
| Polyol prepolymer chain extender of Example 7 | — | — | — | 10 | 10 |
| E100 (Ethacure) | 25 | 15 | 15 | 15 | — |
| 4200 (Unilink) | — | 10 | — | — | — |
| A-187 | 0.4 | 0.4 | 0.4 | 0.4 | 0.4 |
| 15.5% NCO Index | 105 | 105 | 105 | 105 | 105 |
| Gel Time (Sec) | 3.5 | 4.8 | 5.0 | 4.5 | 4.5 |
| Tack Free (Sec) | 5.5 | 7.5 | 7.5 | 6.5 | 7.5 |

Physical Property Testing

Physical property testing for the silicone modified polyureas noted in Table 4 were done in accordance with American Society for Testing and Materials (ASTM). The ASTM test methods and their physical property test descriptions are given below in Table 5:

TABLE 5

|  | Examples | | | | |
|---|---|---|---|---|---|
|  | 16 | 17 | 18 | 19 | 20 |
| Tensile Strength PSI ASTM D-638 | 2541 | 2430 | 2516 | 3350 | 3620 |
| % Elongation ASTM D-638 | 235 | 265 | 410 | 340 | 300 |
| Tear Strength P.L.I. ASTM D-624 | 357 | 340 | 500 | 525 | 610 |
| Shore Hardness D ASTM D2240-81 | 47/40 | 47/40 | 47/40 | 47/40 | 50/45 |
| Abrasion HS-18 Wheel (mg) 1000 gm - 1000 cycle loss ASTM D-4060 | 0.6 | 0.6 | 0.4 | 0.4 | 0.4 |
| Elcometer PSI | — | — | — | — | — |
| Concrete | 450 | 375 | 750 | 900 | 950 |
| Steel ASTM 4551 | >1000 | >1000 | >1300 | >1500 | >1500 |
| Moisture Vapor Transmission (Perms) ASTM E96-80 | <0.1 | <0.1 | <0.1 | <0.1 | <0.1 |
| Water Absorption (%) WT Gain ASTM D570-95 | 1.90 | 2.20 | 1.25 | 0.85 | 0.85 |

Additional examples of silicone modified polyureas are given below. Comparative examples 21-22 are conventional ratios and compositions and do not include any polyol prepoymer. Examples 23-24 are examples of the present silicone modified polyurea and do include amounts of different combinations and ratios of the novel polyol prepolymer chain extenders.

COMPARATIVE EXAMPLES 21-22 AND EXAMPLES 23-24

TABLE 6

|  | Examples | | | |
|---|---|---|---|---|
|  | 21 | 22 | 23 | 24 |
| D2000 (Jeffamine) | 50 | 50 | 45 | 45 |
| T-5000 (Jeffamine) | 10 | 10 | 10 | — |
| Polyol prepolymer chain extender of Example 7 | — | — | 10 | — |
| Polyol prepolymer chain extender of Example 6 | — | — | — | 25 |
| E100 (Ethacure) | 25 | 15 | 15 | — |
| 4200 (Unilink) | — | 10 | — | — |
| A-187 | 0.4 | 0.4 | 0.4 | 0.4 |
| 15.5% NCO Index | 105 | 105 | 105 | 105 |
| Gel Time (Sec) | 3.5 | 4.8 | 5.0 | 35.0 |
| Tack Free (Sec) | 5.5 | 7.5 | 7.5 | 50.0 |

Physical Property Testing

Physical property testing for the silicone modified polyureas noted in Table 6 were done in accordance with American Society for Testing and Materials (ASTM). The ASTM test methods and their physical property test descriptions are given below in Table 7:

TABLE 7

| | Examples | | | |
|---|---|---|---|---|
| | 21 | 22 | 23 | 24 |
| Tensile Strength PSI ASTM D-638 | 2541 | 2430 | 2516 | 3350 |
| % Elongation ASTM D-638 | 235 | 265 | 410 | 340 |
| Tear Strength P.L.I. ASTM D-624 | 357 | 340 | 500 | 525 |
| Shore Hardness D ASTM D2240-81 | 47/40 | 47/40 | 47/40 | 47/40 |
| Abrasion HS-18 Wheel 1000 gm - 1000 cycle ASTM D-4060 | 0.6 mg loss | 0.6 mg loss | 0.4 mg loss | 0.4 mg loss |
| Elcometer PSI | — | — | — | — |
| Concrete | 450 | 375 | 750 | 900 |
| Steel ASTM 4551 | >1000 | >1000 | >1300 | >1500 |
| Moisture Vapor Transmission (Perms) ASTM E96-80 | <0.1 | <0.1 | <0.1 | <0.1 |
| Water Absorption WT Gain ASTM D570-95 | 1.90% | 2.20% | 1.25% | 0.85% |

Additional examples of silicone modified polyureas are given below. Comparative examples 25-26 are conventional ratios and compositions and do not include any polyol prepoymer. Examples 27-28 are examples of the present silicone modified polyurea and do include amounts of different combinations and ratios of the novel polyol prepolymer chain extenders.

COMPARATIVE EXAMPLES 25-26 AND EXAMPLES 27-28

TABLE 8

| | Examples | | | |
|---|---|---|---|---|
| | 25 | 26 | 27 | 28 |
| D2000 (Jeffamine) | 50 | 50 | 45 | 45 |
| T-5000 (Jeffamine) | 10 | 10 | 10 | — |
| Polyol prepolymer chain extender of Example 7 | — | — | 10 | 10 |
| E100 (Ethacure) | 25 | 15 | 15 | 15 |
| 4200 (Unilink) | — | 10 | — | — |
| A-187 | 0.4 | 0.4 | 0.4 | 0.4 |
| 15.5% NCO Index | 105 | 105 | 105 | 105 |
| Gel Time (Sec) | 3.5 | 4.8 | 5.0 | 4.5 |
| Tack Free (Sec) | 5.5 | 7.5 | 7.5 | 6.5 |

Physical Property Testing

Physical property testing for the silicone modified polyureas noted in Table 8 were done in accordance with American Society for Testing and Materials (ASTM). The ASTM test methods and their physical property test descriptions are given below in Table 9:

TABLE 9

| | Examples | | | |
|---|---|---|---|---|
| | 23 | 24 | 25 | 26 |
| Tensile Strength PSI ASTM D-638 | 2541 | 2430 | 2720 | 3610 |
| % Elongation ASTM D-638 | 235 | 265 | 420 | 350 |
| Tear Strength P.L.I. ASTM D-624 | 357 | 340 | 510 | 550 |
| Shore Hardness D ASTM D2240-81 | 47/40 | 47/40 | 47/40 | 47/40 |
| Abrasion HS-18 Wheel 1000 gm - 1000 cycle ASTM D-4060 | 0.6 mg loss | 0.6 mg loss | 0.4 mg loss | 0.4 mg loss |
| Elcometer PSI | — | — | — | — |
| Concrete | 450 | 375 | 750 | 900 |
| Steel ASTM 4551 | >1000 | >1000 | >1300 | >1500 |
| Moisture Vapor Transmission (Perms) ASTM E96-80 | <0.1 | <0.1 | <0.1 | <0.1 |
| Water Absorption WT Gain ASTM D570-95 | 1.90% | 2.20% | 1.25% | 0.85% |

The present invention also includes methods for applying the silicon modified polyurea to surfaces.

Spray Application

In one aspect of the present invention, a method is included for applying the present invention silicone modified polyurea to a substrate, and more specifically, applying to concrete or steel.

For preparation of old concrete prior to application, sandblasting, shot blasting, or water blasting is highly preferable to remove any surface contaminates. Any oils or fats should be removed prior to application of the silicone modified polyurea. Acid etching may be required (followed by a thorough rinsing) to open the pores of the concrete to accept a primer coat. A primer may be applied, such as Reactamine® Primer from Reactamine Technologies, LLC, to further improve the bonding of the silicone modified polyurea to the concrete. A minimum 40-mil coating is generally preferable for improved chemical and abrasion resistance.

For preparation of new concrete, the concrete should cure for preferably a minimum of 30 days. Also preferably, sand blasting, shot blasting, or acid etching (15% muriatic acid/ 85% water) is required to remove the surface lattice that appeared during the curing process. Again, a primer, such as Reactamine® Primer, is preferably applied to reduce out gassing of the concrete.

For preparation of steel, the steel must be prepared to a "near white metal" equivalent to SSPC 10 or NACE 2 standards. For immersion service, a 3-mil blast profile is preferable. A 2-mil blast profile is generally recommended. A 10-40 mil coat of Reactamine® Primer is generally preferable for improved chemical resistance performance.

In one aspect, the present invention includes the following spray application. A substrate (concrete, steel, etc.) is preferably prepared as described herein. In one aspect, the B-component is contained in one container and the A-component is contained in another. Into each of these two containers is placed a displacement pump connected to a hose. The respective displacement pump pumps the respective component stored in that container through the respective hose to a separate volumetric cylinder-type measurement devices, which accurately measures the exact amounts of the A-component and B-component. The A-component is measured in one volumetric cylinder-type measurement device and the B-component is measured in another. Preferably, each cylinder measures equal Each volumetric cylinder-type measurement device is then pressurized in the range from 500 psi to 3000 psi. The A-component and the B-component are then separately pumped through a heater which heats each component separately to temperatures from about 50° F. to 250° F. The separated individual components are then pumped through one heated hose for each component and sent to an impingement spray gun.

For example, the present invention silicone modified polyurea is preferably applied to the substrate using a high pressure plural component pump (1:1 by volume), such as a GlasCraft-MX® equipped with a Prober® impingement mix spray gun or a Gusmer® H-20/35 proportioning unit and a Gusmer® GX-7 (400 Series) or GX-8 impingement mix spray gun. As described above, each proportioning unit is preferably capable of supplying the correct pressure and heat for the required hose length on a consistent basis. In addition, the hose is preferably heated to keep the reactants at a temperature of at least 150° F. Preferably, for processing, the block temperature of the heater was set at 160° F. for both the B-component and the A-component and the hose temperature was set at 160° F. for both components. Processing was at 2500 psig static pressure and 2000 psig spray pressure.

SUMMARY

There has been described a novel polyol prepolymer chain extender and silicone modified polyurea that can be aliphatic or aromatic. It should be understood that the particular embodiments described within this specification are for purposes of example and should not be construed to limit the invention. Further, it is evident that those skilled in the art may now make numerous uses and modifications of the specific embodiment described, without departing from the inventive concepts. For example, the polyol prepolymer chain extenders that are described can be used as chain extenders for other types of reactions to produce acrylics, epoxies, and other materials. It is also evident that the process steps recited may in some instances be performed in a different order, or equivalent structures and processes may be substituted for the various structures and processes described. The structures and processes may be combined with a wide variety of other structures and processes.

| GLOSSARY | |
|---|---|
| ETHACURE® 100 | Diethyltoluene diamine chain extender available from Albemarle ™ Corporation. |
| JEFFAMINE® D-2000 | A 2000 molecular weight polyoxypropylene diamine available from Huntsman Petrochemical Corporation. |
| JEFFAMINE® T-5000 | A 5000 molecular weight polyoxypropylene triamine available from Huntsman Petrochemical Corporation. |
| SILQUEST® A-187 | Functional alkoxy silane available from OSi Specialties, Inc./Crompton Corp. |
| UNILINK ® 4200 | Dialkyl substituted methylene dianiline chain extender available from UOP Chemical Co. |
| Tinuvin ® 328 | UV stabilizer available from Ciba-Geigy Corp. |
| Tinuvin ® 765 | UV stabilizer available from Ciba-Geigy Corp. |
| Ti-Pure ® R-900 | Rutile titanium dioxide available from E. I. DuPont de Nemours Co. |
| Silquest ® A-1100 | Gamma-aminopropyltri-ethoxysilane is an amino-functional coupling agent from OSi Specialties, Inc./Crompton Corp. |
| MDI 1680 | 4,4-Diphenylisocyanate from Huntsman Petrochemical Corp. |
| N-3400 | 1,6-Hexamethylenediisocanate. |
| CoatOSil ® 2810 | Epoxy silicone copolymers similar to HP 1000. |
| OSi 2812 | 2000 mwt silicone endcapped diol. |
| NH1220 and NH1420 | Polyaspartic esters from Bayer. |
| AFL-5 and AFL-10 | Aminofunctional poly-dimethylsiloxanes |
| IPDI | Isophorone di-isocyanate |
| HDI | Hexamethyl di-isocyanate |
| TMXDI | Tetramethyl xylene di-isocyante |
| Rubinate ® 9484 MDI | Methylene diphenyl isocyanate from Huntsman Petrochemical Corp. |

What is claimed:

1. A method of making a silicone modified polyurea comprising:
    combining an adduct of at least one amine selected from the group consisting of primary aliphatic amines, primary cyclo-aliphatic, secondary aliphatic amines, primary aromatic amines, and secondary aromatic amines, and mixtures thereof, with at least one epoxy functional silicone to form a solution;
    reacting said solution to form a polyol prepolymer chain extender, wherein said reacting comprises heating said solution at a temperature in the range of from 130° F. to 210° F. for a time period of from 1 hour to 24 hours; and
    mixing said polyol prepolymer chain extender with at least one polyisocyanate to form a silicone modified polyurea, wherein said mixing is performed by a pressurizable spray apparatus.

* * * * *